INVENTOR.
ALBERT MACOVSKI
BY Lindenberg + Freilich
ATTORNEYS

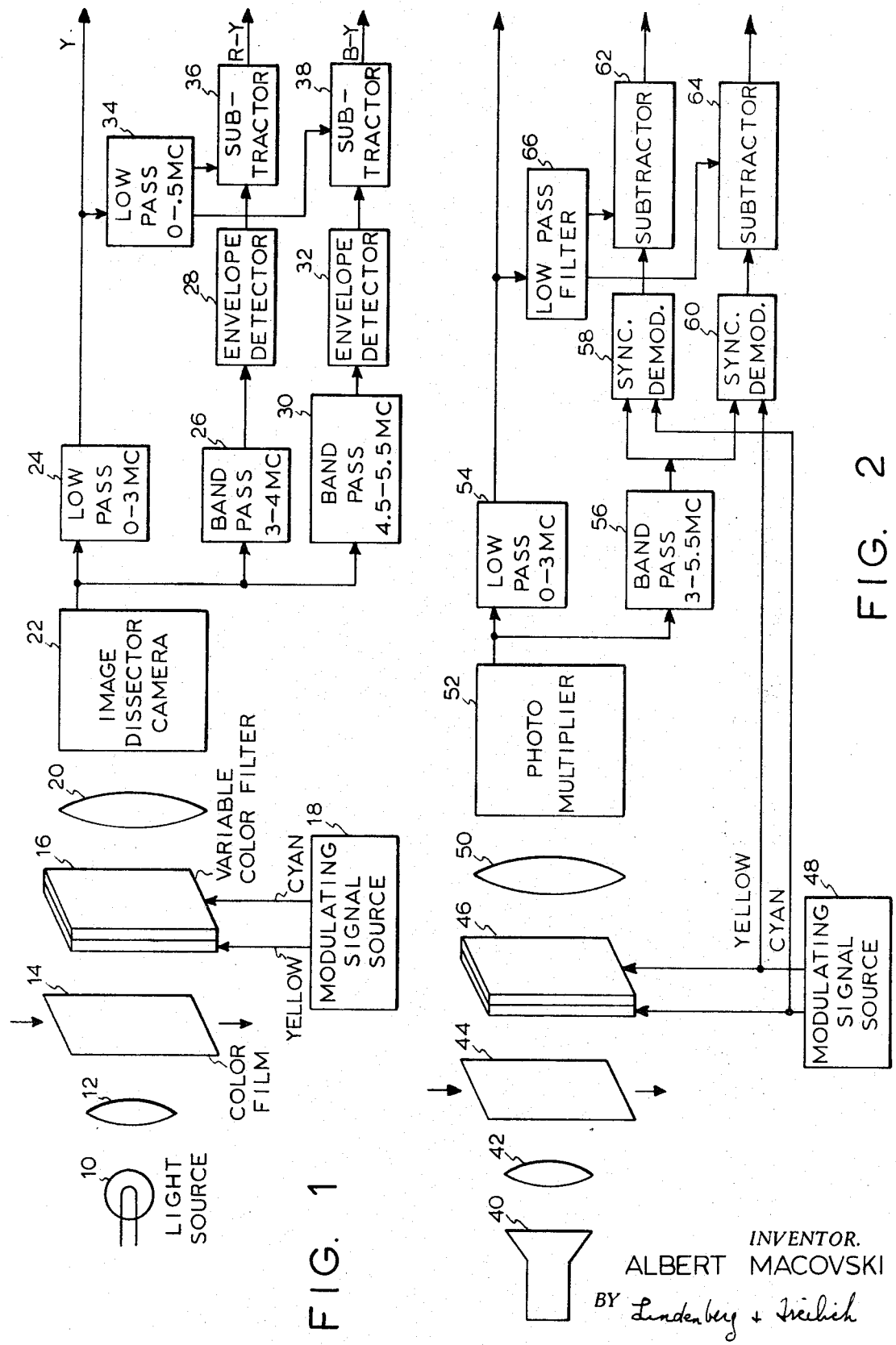

United States Patent Office

3,534,154
Patented Oct. 13, 1970

3,534,154
SINGLE TUBE COLOR CAMERA UTILIZING ELECTRICALLY VARIABLE COLOR FILTERS
Albert Macovski, Palo Alto, Calif., assignor to Stanford Research Institute, Menlo Park, Calif., a corporation of California
Filed Apr. 17, 1967, Ser. No. 631,367
Int. Cl. H04n 9/06
U.S. Cl. 178—5.4    9 Claims

ABSTRACT OF THE DISCLOSURE

This invention provides an arrangement whereby a single monochrome television camera can be used to provide signals suitable for reproducing the subject matter scanned by the camera in color. This is accomplished by the manner of encoding the light reaching the camera from the subject matter.

BACKGROUND OF THE INVENTION

The present-day system for scanning color film employs three photoreceptors of some type. In some systems a flying spot scanner is imaged onto color film, followed by color separation filters and three photomultipliers. In other systems, the luminated color film is viewed by three registered camera tubes.

An object of this invention is the provision of an arrangement for scanning color film which employs a single camera.

Yet another object of the present invention is the provision of a simpler and lower-cost color film scanning system for color television.

SUMMARY OF THE INVENTION

The foregoing and other objects of this invention may be achieved by an arrangement where each different color of light received from the color transparency is modulated at a different frequency or a different phase so that color discrimination can take place in the output of the photoceptor by detecting the different frequencies or different phases in the output signals which are produced by the encoding of the color light. Alternatively, a polychromatic light source or a combination of individually controlled colored light sources may be used wherein the different colors of light may be phase or frequency modulated, whereby the output of the camera contains color signal components corresponding to each modulated light source as modified by the color transparency, thus enabling separation from the single output signal into a plurality of signals suitable for use in color television system.

BRIEF DESCRIPTION OF THE DRAWINGS

FIG. 1 is a schematic drawing of one embodiment of the invention;
FIG. 2 is a schematic drawing of another embodiment of the invention.

DESCRIPTION OF THE PREFERRED EMBODIMENTS

Figure 3:
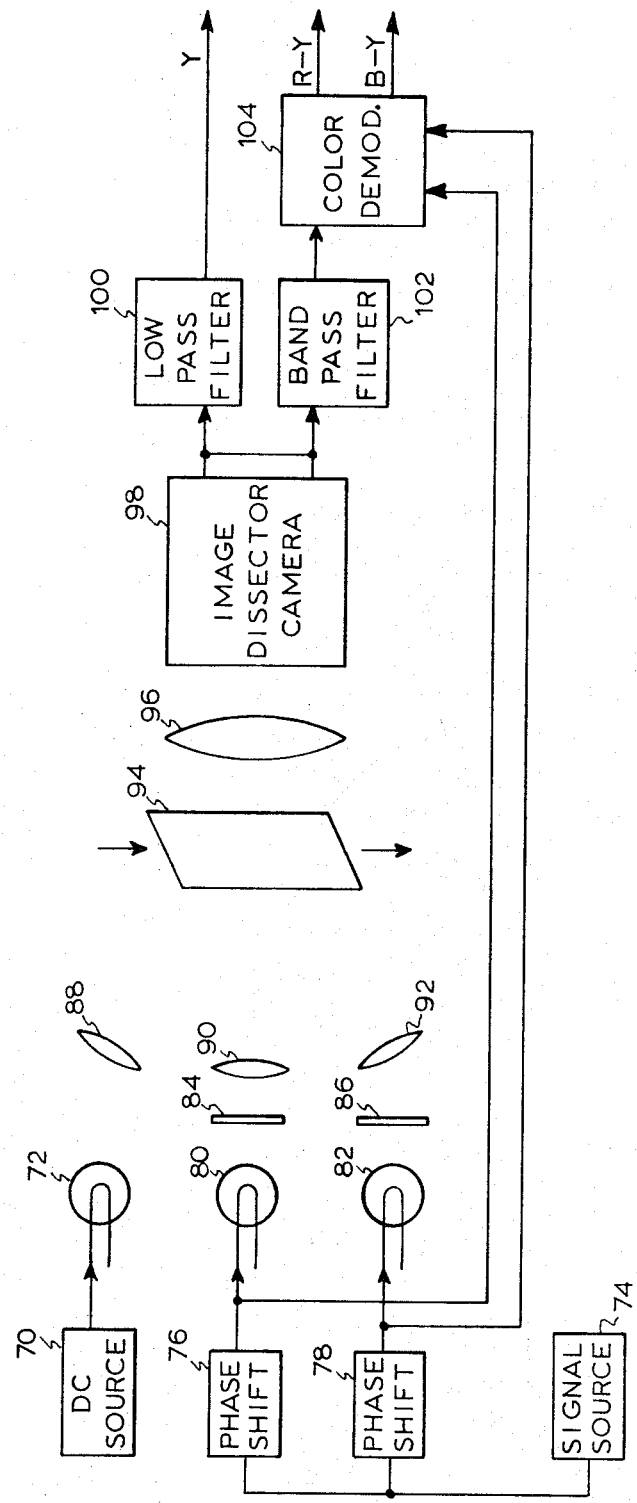
FIG. 3 is a schematic drawing of still another embodiment of the invention.

Referring now to FIG. 1, there may be seen an embodiment of the invention represented in schematic form. A white light source 10 has its lumination projected through a lens 12 onto color film 14. The color film 14 is representative, for example, of motion picture color film which is moving, as represented by the arrows, at the usual 24 frames per second through a film gate, not shown. The light which passes through the color film, which is now modulated by the colors in the color film next passes through an electrically variable color filter 16. This electrically variable color filter is electrically switched sequentially through various colors. The switching is done in a manner so that, for example, the filter will pass red light and then go to neutral at one high frequency and will pass blue light and then go to neutral at a second high frequency. A modulating signal source 18 provides the two high frequency switching signals.

The light output from the color filter 16 is projected by a lens 20 upon an image dissector camera 22. The average value of the resultant output of the image dissector forms a luminant signal. Accordingly, the output of the image dissector camera is passed through a low pass filter 24 (on the order of 0 to 3 megacycles) and the output of the low pass filter comprises the Y or luminant signal. Assuming that the modulating signal source enables the variable color filter 16 to pass red light so that the red light is modulated at a frequency between 3 to 4 megacycles, by way of example, then the output of the image dissector camera may be passed through a bandpass filter 26 which will pass the frequencies of 3 to 4 megacycles. The output of the bandpass filter is envelope detected by an envelope detector 28. Similarly, assuming by way of example, that the variable color filter is modulated to pass blue light at a frequency of between 4½ to 5½ megacycles, then the output of the image dissector camera can be passed through a bandpass filter 30, 4½ to 5½ megacycles bandwidth, and the output therefrom is applied to an enveloped detector 32.

The luminance signal is passed through a 0 to .5 megacycle low pass filter 34, the output of which is applied respectively to the subtractor 36 and to the subtractor 38. The subtractor 36 subtracts the output of the low pass filter 34 from the output of the envelope detector 28 to provide the R minus Y color difference signal. The subtractor 38 subtracts the output of the low pass filter 34 from the envelope detector 32 to provide the B minus Y color difference signal. Accordingly, there are available the color difference signals, Y, R/Y and B/Y, which can thereafter be transmitted and/or utilized for reproduction in color of the scene on the color film.

Another method for modulating the color transmission by the filter 16 is to use the same frequency but to transmit the two colors in phase quadrature. The output of the respective bandpass filters 26 and 30 would then be applied to synchronous detectors which would use the original filter switching signal to maintain synchronism. This is exemplified by the embodiment of the invention shown in FIG. 2.

By way of example, of an electrically variable color filter having the properties described, a sandwich of linear polarizers and electro/optic material, such as liquid nitrobenzene, or ADP or KDP crystal, and a chromatic retarder (a birefringent material whose birefringence is a function of wavelength). These materials and properties are available and have been described in the literature. By way of example, two patents describing electrical variable color filters are Pat. No. 2,493,200 by E. H. Land, entitled, "Variable Polarizing Color Filter," and Pat. No. 2,834,254, by S. J. Sage, entitled, "Electronic Color Filter."

Two electrically variable color filters of the type described, one of which alternates between neutral and cyan transmission, while the other alternates between yellow and neutral transmission in quadrature with the transmission of the first may be employed. The frequency at which this modulation takes place can either be beyond the luminance bandwidth (0 to 3 megacycles), or can be within the luminance bandwidth and be an odd multiple of one-half the line scan rate so as to be of very low visibility. The electrically variable color filter need not be at an imaging point, but can be placed anywhere in the light path between the source of lumination and the image dissector camera, as shown in FIG. 1.

FIG. 2 represents another embodiment of the invention. Here, a flying spot scanner 40, having a polychromatic phosphor is employed. Its light output is employed by the lens 42 to scan the motion picture color film 44. The light passes through the color film then passes through the electrically variable filter 46 which is driven from a modulating signal source so that the red and blue light passing through the filter occur at the same frequencies but are phase modulated 90° with reference to one another. The output of the filter 46 is directed by a lens 50, upon a photomultiplier 52. The photomultiplier tube 52 has in its output the signal components which are modulated to enable their separation into the color difference signals required for reproducing the scene represented on the color transparency 44 in color. Thus, the output of the photomultiplier is applied to a low pass filter 54, as explained in FIG. 1, and also to a bandpass filter 56, which passes those frequencies between 3 and 5½ megacycles. The output of the bandpass filter is applied to two synchronous demodulators respectively 58 and 60. The synchronous demodulator 58 is synchronized with the cyan modulating signals applied to the filter 46 and the synchronous demodulator 60 is synchronized with the yellow modulating signals. The two phase-quadrature outputs of the respective synchronizing demodulators 58 and 60 are respectively applied to subtractors 62 and 64. The luminance signal is applied through a low pass filter 66 of the same type as the low pass filter 34 in FIG. 1, to the respective subtractors which provide as their outputs R minus Y and B minus Y.

Instead of using variable color filters with electro/optic material, as described previously, intensity modulated light sources can be used. These must be capable of providing a variable-intensity light output at a few megacycles per second. This can be achieved using light-emitting diodes. Either narrow-band light emitters for each color can be used (such as gallium arsenide for red, and gallium phosphide for green), or broadband white light emitters can be used with color filter material. As described in connection with FIG. 1 or FIG. 2, either different frequencies or different phases can be used to distinguish the various colors. For example, DC can be applied to one light emitter and quadrature phases of a high frequency signal to the other two. The average values are adjusted to obtain the correct luminance representation while synchronous detection is used to derive the color signals. FIG. 3 is a schematic diagram of the briefly described system. A DC source 70 provides power to a light source 72. A signal source 74 provides a high frequency signal to the respective phase shifters 76, 78.

The phase shifters provide a quadrature phase difference between their respective outputs which are respectively connected to light sources 80, 82. Light source 72 can be a white light source, light source 80 is a white light source, the light output of which passes through a red filter 84. The white light source 82 has its light output passing through a green filter 86. The three lenses respectively 88, 90, 92, illuminate the color film with light from the three sources. The light that passes through the color film passes through a lens 96 which directs it upon an image dissector camera 98. The output of the image dissector camera is applied to the same circuitry as is shown in FIG. 2. Thus, a low pass filter 100 provides the luminance signal Y. A bandpass filter 102 passes its output consisting of 3 to 5½ megacycle signal components to the color demodulators 104 which are synchronized by the respective phase shift signals derived from the output to the phase shift circuits 76 and 78. The color demodulators 104 comprise the same circuitry as is shown in FIG. 2 for synchronous demodulation and establishment of the color difference signals R/Y and B/Y.

There has accordingly been shown and described herein a novel, useful and relatively inexpensive arrangement for deriving from a color film, using a single television camera, the signals required for reproducing the image which is scanned in color. While the description of the embodiments of the invention have been using color transparencies or movie film, as exemplary of the subject matter which is being reproduced in color, it should be obvious to those skilled in the art, that an embodiment of the invention such as the one shown in FIG. 3, may be used for illuminating a set or a scene instead of a color transparency, without departing from the spirit and scope of this invention and its claims.

What is claimed is:

1. A system for providing the color signals required to reproduce in color, from the output of a single television camera, a colored subject, comprising:
   means for illuminating said colored subject with light which then passes therefrom to said camera;
   means positioned between said colored subject and said camera for modulating with respect to time the light reaching said camera for differently encoding different primary color components thereof; and
   means coupled to the output of said television camera for deriving therefrom signals suitable for utilization by a color television system.

2. A system as recited in claim 1 wherein said means for differently encoding said color components of said light reaching said camera includes an electrically variable color filter means positioned to intercept the light reaching said camera;
   means for varying the color transmissivity of said color filter means at one frequency for one primary color and at a second frequency for a second primary color.

3. A system as recited in claim 1 wherein said means for differently encoding the primary color components of the light reaching said camera includes an electrically variable color filter means; and
   means for varying the color transmissivity of said filter means at a first primary color at the same frequency as the color transmissivity is varied with respect to a second primary color, but in phase quadrature relative thereto.

4. A system for scanning a colored object with a single television camera which produces output signals usable in a color television system comprising:
   filter means for differently modulating with respect to time at least two primary light colors, said filter means being positioned in the light path between said colored object and said television camera;
   first circuit means connected to the output of said television camera for producing signals at first and second frequencies representative of the luminance of said colored object;
   second circuit means connected to the output of said television camera for producing at least two color difference signals.

5. Apparatus as recited in claim 6 wherein said filter means includes:
   first means having the property that its transmissivity of a first primary color is variable responsive to a variable electrical signal being applied thereto;
   second means having the property that its transmissivity of a second primary color is variable in response to a variable electrical signal being applied thereto;
   a source of first and second variable electrical signals at first and second frequencies; ;
   means for applying said first and second variable electrical signals respectively to said first and second means;
   said first circuit means at the output of the television camera for deriving luminance signals including a low pass filter;

said second circuit means for deriving two primary color difference signals including;
a first bandpass filter for passing signals modulated at said first frequency;
means for demodulating the output of said first bandpass filter, and a second bandpass filter for passing said second frequency; and
means for demodulating the output of said second bandpass filter.

6. Apparatus as recited in claim 5 wherein said first and second frequencies are the same but in phase quadrature with respect to one another;
said means for demodulating the output of said first bandpass filter and said means for demodulating the output of said second bandpass filter respectively comprise:
a first and second synchronous demodulator;
means for synchronizing said first synchronous demodulator with said first variable electrical signals; and
means for synchronizing said second synchronous demodulator with said second variable electrical signals.

7. Apparatus as recited in claim 4 wherein said light source comprises a substantially steady source of illumination and said television camera comprises an image dissector camera.

8. Apparatus as recited in claim 4 wherein said light source comprises a flying spot scanner and said television camera comprises a photomultiplier.

9. Apparatus as recited in claim 1 wherein said means for illuminating the colored subject with light includes means for generating light having a first primary color, and means for generating light having a second primary color; said means for modulating the light reaching said camera for differently encoding different primary color components thereof includes means for modulating the frequency of said first primary color light at a first frequency and means for modulating the frequency of said second primary color light at a second frequency.

References Cited
UNITED STATES PATENTS

| | | | |
|---|---|---|---|
| 2,459,778 | 1/1949 | Larson | 178—7.2 |
| 2,586,635 | 2/1952 | Fernsler | 178—5.4 |
| 2,705,258 | 3/1955 | Lesti | 178—5.4 |
| 2,733,291 | 1/1956 | Kell | 178—5.4 |
| 2,740,831 | 4/1956 | Varga | 178—5.4 |
| 2,880,267 | 3/1959 | Goldmark et al. | 178—5.4 |
| 2,892,883 | 6/1959 | Jesty et al. | 178—5.4 |
| 3,015,689 | 1/1962 | Hirsch | 178—5.4 |
| 2,804,803 | 9/1957 | Edwards et al. | 178—5.4 |
| 3,303,273 | 2/1967 | Williams et al. | 178—5.4 |

ROBERT L. GRIFFIN, Primary Examiner

J. C. MARTIN, Assistant Examiner